United States Patent
Fellenstein et al.

(10) Patent No.: US 7,809,794 B2
(45) Date of Patent: Oct. 5, 2010

(54) METHOD AND SYSTEM FOR NOTIFICATION OF ELECTRONIC MESSAGE REPLY REQUIREMENTS

(75) Inventors: Craig Fellenstein, Brookfield, CT (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1802 days.

(21) Appl. No.: 10/455,167

(22) Filed: Jun. 5, 2003

(65) Prior Publication Data

US 2004/0249890 A1 Dec. 9, 2004

(51) Int. Cl.
*G06F 15/16* (2006.01)
(52) U.S. Cl. .................... 709/206; 709/205; 709/217
(58) Field of Classification Search ............... 709/206, 709/205
See application file for complete search history.

(56) References Cited

U.S. PATENT DOCUMENTS

| | | | |
|---|---|---|---|
| 5,057,935 A | 10/1991 | Williams | 358/402 |
| 5,245,532 A | 9/1993 | Mourier | 700/90 |
| 5,377,354 A | 12/1994 | Scannell et al. | 718/103 |
| 5,652,789 A | 7/1997 | Miner et al. | 379/201.01 |
| 5,675,733 A | 10/1997 | Williams | 709/206 |
| 6,088,717 A | 7/2000 | Reed et al. | |
| 6,108,688 A | 8/2000 | Nielsen | 709/206 |
| 6,122,348 A | 9/2000 | French-St. et al. | 379/88.23 |
| 6,345,288 B1 | 2/2002 | Reed et al. | 709/201 |
| 6,353,661 B1 | 3/2002 | Bailey, III | 379/93 |
| 6,360,221 B1 | 3/2002 | Gough et al. | 707/10 |
| 6,366,913 B1 | 4/2002 | Fitler, Jr. et al. | 707/9 |
| 6,414,950 B1 | 7/2002 | Rai et al. | 370/338 |
| 2002/0099775 A1* | 7/2002 | Gupta et al. | 709/205 |

* cited by examiner

*Primary Examiner*—David Wiley
*Assistant Examiner*—Kyung H Shin
(74) *Attorney, Agent, or Firm*—Schmeiser, Olsen & Watts; William H. Steinberg

(57) ABSTRACT

The present invention discloses a new function within electronic mail applications whereby documents or messages, which are annotated or designated with a notification such as "reply requested", are monitored by a new proactive reminder system, in order to minimize the occurrence of the late responses. In the present invention, a new selection is added to the menus to "enable reminder function". In the process of the present invention, the sender enables the reminder function. The sender then selects the date and time to send a first reminder, (if response has not been received). The sender then selects frequency of reminder after reminder is sent, (every 8 hours for example). The sender can choose to be notified or excluded from reminders. A sender may also choose to be notified, at the reminder interval, that responses have not yet been received; however, in the case where the audience of the note was very large, the user may wish for reminders to be sent to recipients, but not to be copied on them.

30 Claims, 7 Drawing Sheets

| 1 | 05-01-03 | 9:00am | 4 hours | 0 |
|---|---|---|---|---|
| 53 | 54 | 55 | 56 | 57 |

METHOD AND SYSTEM FOR NOTIFICATION OF ELECTRONIC MESSAGE REPLY REQUIREMENTS

FIELD OF THE INVENTION

The present invention relates to a method and system for receiving electronic messages and in particular to a method and system for notification to a recipient of the electronic message reply requirements and for monitoring the compliance of recipients to these reply requirements.

BACKGROUND OF THE INVENTION

Electronic mail (email) communications are an integral part of any business, and widely used outside of business as well. Although several new technologies currently compete, as the most ubiquitous tool in business communications, email remains one of the single most used communications tools for both the business and the personal user. Widespread availability, ease of use, and functionality are key components which hold email in front of developing communications methods; however, as new technologies compete for the top spot, email applications must continue to build upon the strong foundation currently in place to maintain their edge as the tool of choice. By any current standard, email applications would have to be rated as mature technology; however, if improvements in email applications cease to move forward, and other tools continue to improve, loss of market share will undoubtedly result.

One key feature missing in legacy email tools is a proactive system to ensure timely responses to messages. The average email user receives many (tens/hundreds) of email messages every day/week. It is currently a very cumbersome task to track messages, which a user has either sent or received, in which a reply message is both requested and expected. A user's in-box may at any given point contain many active "active" documents, and the process of identifying messages which the user must reply to, or messages the user is awaiting a reply upon, is manual and very inefficient.

As an example, in the current method, a user first creates an email message. The user can then mark the email message "reply requested" and select a reply requested by date option. At this point, the current email application functionality ends. In legacy email systems selecting these "advanced functions" through the email menus, in Lotus Notes for example, does nothing more than add the following unremarkable lines to the header of the note.

"Received: Sep. 12, 2002 04:34 PM
Please respond by Sep. 13, 2002"

In reviewing email applications, it is difficult to determine whether setting "reply request" actually did anything, and in most cases very close scrutiny of the note was necessary to even determine the feature had enabled in the note received. This feature in legacy email systems does very little to ensure that firstly, the user even notices a reply has been requested, and that the secondly, a prompt reply will be received.

Ease of use and best breed functionality are imperative in modern email systems. Many user interface enhancements have been added to email systems over the past several years; however, room for improvement continues to exist. One current shortfall in legacy email systems is the lack of a proactive system whereby users are reminded of due, or overdue, replies to previously-received email messages.

With legacy email functionality, it is only with great difficulty that the user can open his or in-box and determine which messages require action, and what the respective priority of each of the messages requiring action should be. During busy periods, this information is imperative, as the user may otherwise be determined to be unresponsive, when in fact the user may simply be responding to messages of lower priority. In order to correct this problem, a system is needed in which the user will be assisted through reminder messages, and the message sender is also reminded of due/overdue responses.

Therefore, there remains a need for a method and system that can notify an electronic mail message recipient of the requirement to reply to the received message and the requirements surrounding such a message reply. The present invention addresses these shortcomings and will now be described in additional detail through a practical example of usage.

SUMMARY OF THE INVENTION

It is an objective of the present invention to provide a method to notify the recipient of an electronic message of the need to reply to the received message.

It is a second objective of the present invention to provide a method that will remind the recipient of an electronic message of the need to reply to a received message.

It is a third objective of the present invention to provide a method and system to prioritize the electronic message reply requirements and to notify the message recipient of these response requirements.

It is a fourth objective of the present invention to provide a method to monitor the response status of an electronic message that requires a response from the recipient.

The present invention discloses a new function within electronic mail applications whereby documents or messages, which are annotated or designated with a notification such as "reply requested", are monitored by a new proactive reminder system, in order to minimize the occurrence of the late responses.

In accordance with the method of the present invention, a reminder technique is incorporated into the electronic mail application process. In this process, there is a detection of a newly created electronic mail ('email') message. Following the detection of this message, there is determination of whether there are any recipient response requirements for this message. The sender of the email message will provide any reply requirements. When a reply is required or desired by the sender, the reply requirements are captured by the application. The application will also transmit these reply requirements to the recipient of the email message. Once the recipient receives the email message, the application of the present invention will begin to monitor the response of the recipient to the received message. The monitoring of the response will be in accordance with the reply requirements captured earlier by the application. At a designated time, if the recipient has not replied to the message, the application will send a reminder message to the recipient to get them to respond to the message. Once the recipient has responded to the received message, the application of the present invention will terminate.

DETAILED DESCRIPTION OF THE INVENTION

Figure 1:
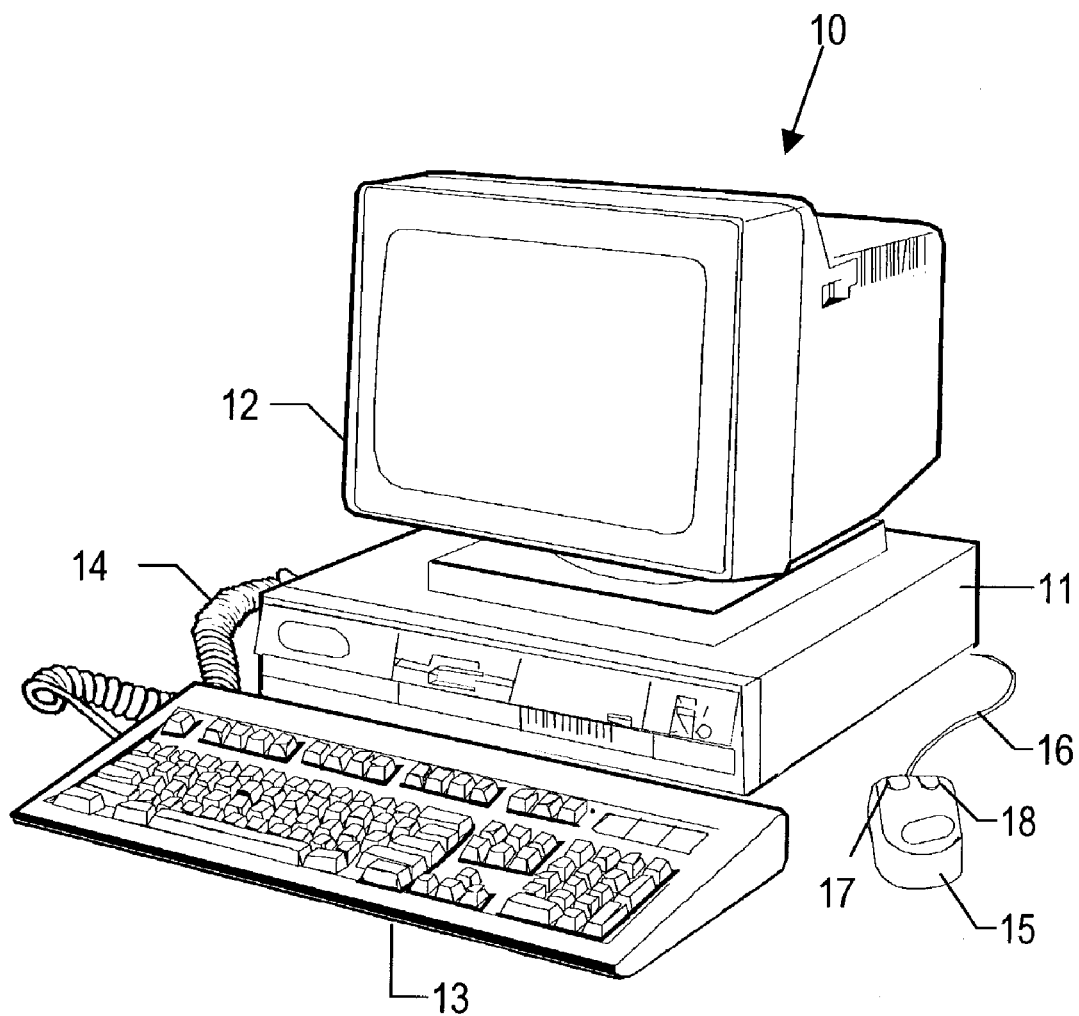
FIG. 1 is a conventional computing device used that can be used to transmit and receive electronic messages via a computer network.

Electronic mail message transmissions occur over computing devices, usually personal computers, connected to a communication network. With reference now to FIG. 1, there is depicted a pictorial representation of computing device 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
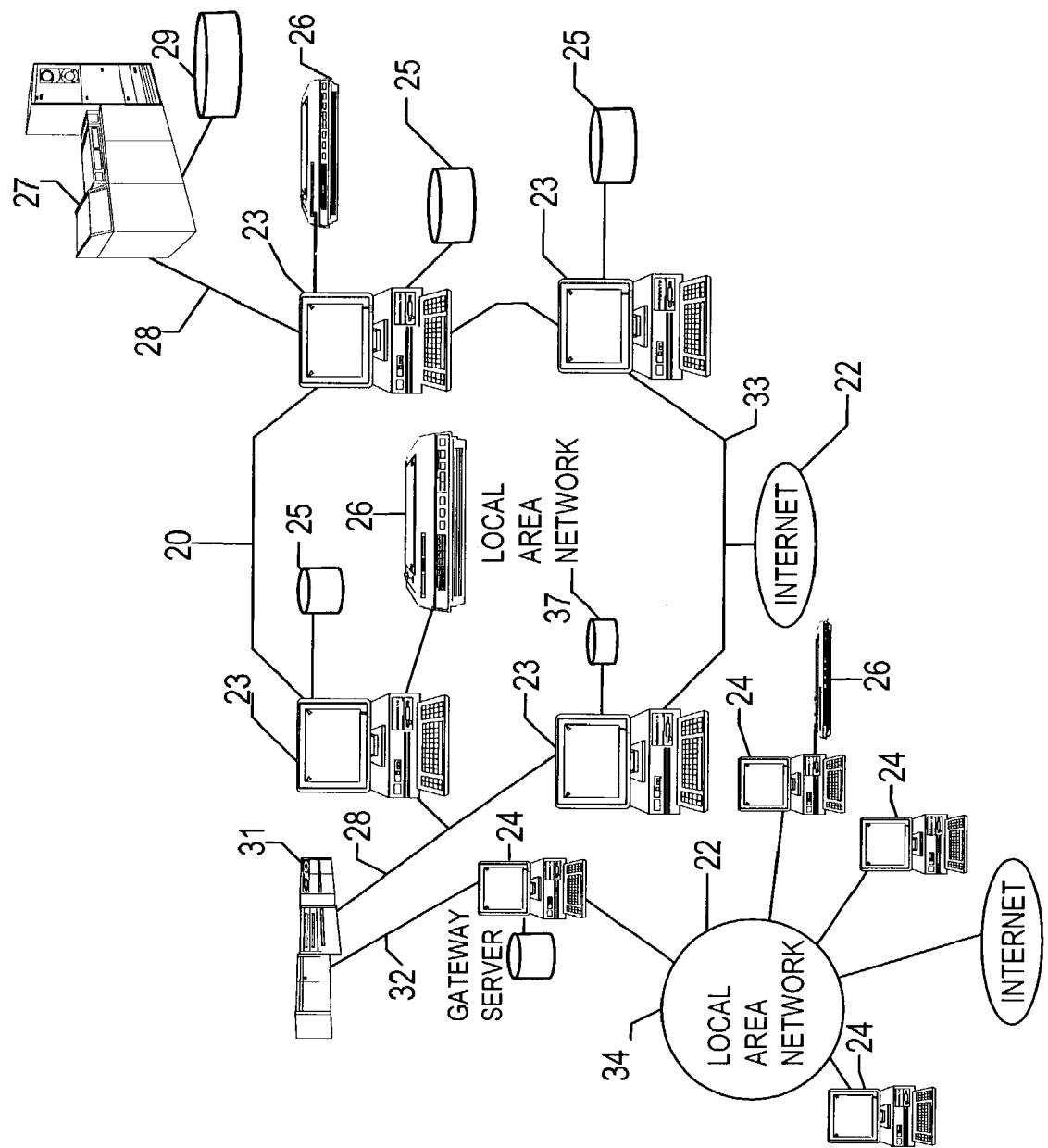
FIG. 2 is a diagram of a computer network over which electronic messages may be transmitted between a sender and receiver in the present invention.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3A:
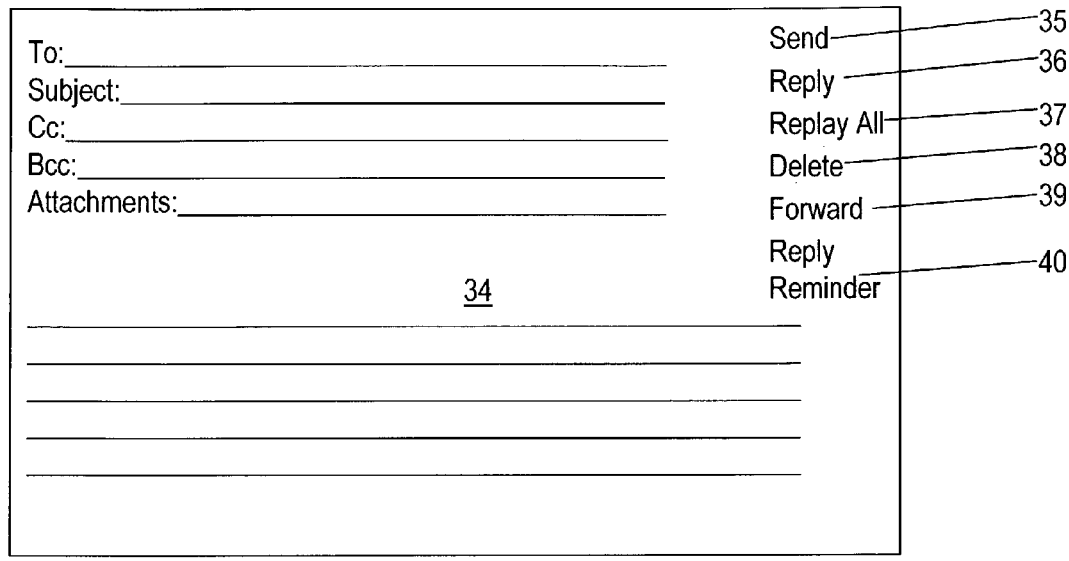
FIG. 3a is an illustration of a screen for an electronic message for transmission in accordance with the present invention.

FIG. 3a illustrates a typical screen during the creation of an electronic message. As shown, there is a text screen 34 for the message and the standard party and subject information To, Subject, Cc, Bcc and Attachments. In addition, there are control icons that allow a sender certain options before and during the transmission of the message. The icons can include send 35, Reply 36, Reply All 37, and Forward 38 and Delete 39. The screen for the present invention could contain an additional Reply Reminder icon 40.

Figure 3B:
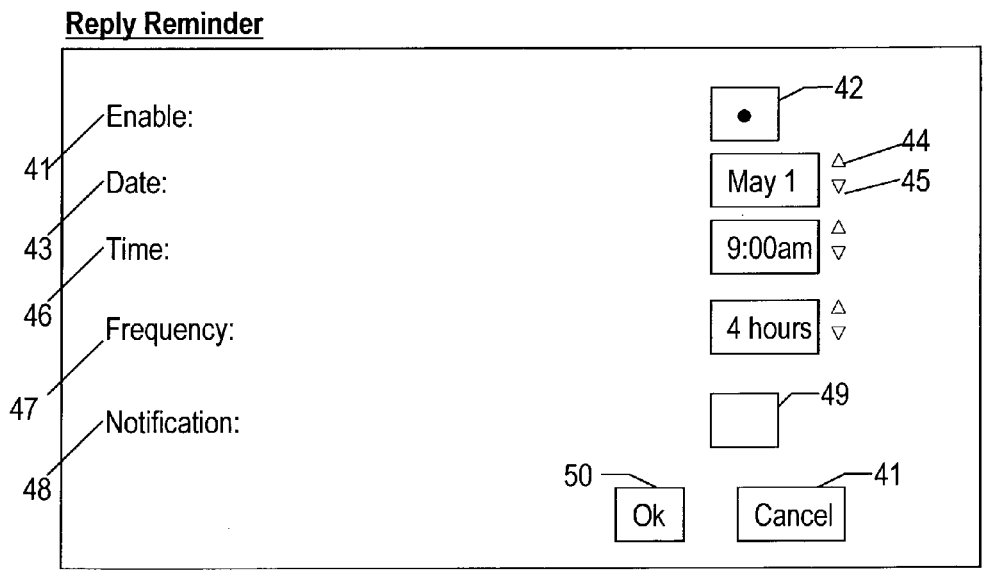
FIG. 3b is an illustration of a screen menu for a sender of an electronic message to supply parameters that will govern the response requirements for that message.

Referring to FIG. 3b, shown is a popup screen containing a menu for a sender of an electronic message to supply parameters that will govern the reply reminder process of a transmitted message. This menu shows an enable icon 41. The sender can click the designated square 42 to enable this reminder process. When the reminder process is enabled a dot could be displayed in the square. In an alternative approach, the clicking of the Reply Reminder icon 40 in the original screen in FIG. 3a could also enable this reminder process. In that case, when the popup screen appears, the square 42 would contain the dot designating this process as enabled. In FIG. 3b, the Date icon 43 provides the sender with the ability to designate the date to begin the reply reminder process if the recipient has not yet responded to the original electronic message. The up and down arrows 44 and 45 respectively give the sender the ability to scroll to various dates in the future. The Time icon 46 enables the sender to specify the particular hour/time of the designated date to begin the reminder process. As with the Date icon, arrows give the sender the ability to scroll up and down to the desired time. The Frequency icon 47 gives the sender the ability to designate the time interval between reply reminders that are to be sent to the recipient. As with the Date and Time icons, arrows give the sender the ability to scroll up and down to the desired time interval. The reply time interval can vary depending of the system from minutes to hours or even days if desired. The Notification icon 48 gives the sender the option of receiving a notification each time a reply reminder is sent to a recipient. As with the Enable icon, to receive the notification, the sender would click this icon and a dot would appear in designated space 49 to indicate the activation of this notification process. The "OK" 50 and "Cancel" 51 icons give the sender the ability to submit, cancel or change reply request parameters.

Figures 3C, 4:
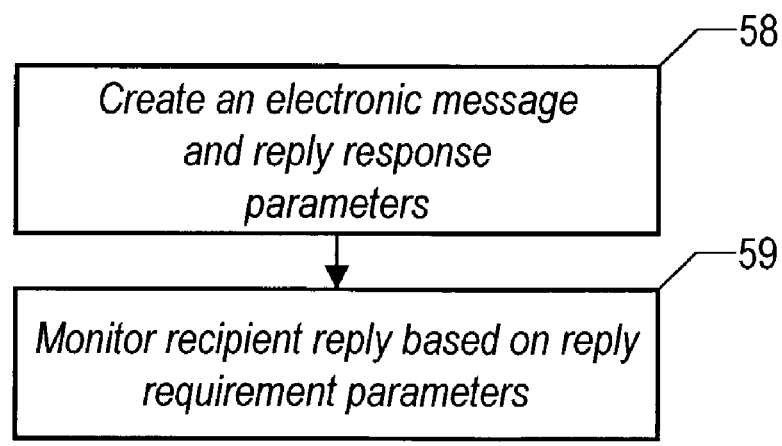
FIG. 3c is an illustration of the reply parameters transmitted with the electronic message that will govern the reply reminders that will be transmitted to recipient of an electronic message when that recipient does not reply to the received message in a timely manner in accordance with the reply parameters.
FIG. 4 is an illustration of the primary components of the system of the present invention.

FIG. 3c illustrates a record showing the specified parameters that will govern the reply reminder process for a transmitted electronic message. As shown, this record 52 contains five fields with each field containing a parameter related to the transmission of reply reminders to the recipient. This record will be transmitted to the recipient along with the primary electronic message. However, this information will not be displayed to the viewer of the computer screen or screen of the transmitting device. As shown field 53 contains the enable designation for the message. In this record, the 1 designation indicates that the sender wants to enable the reply reminder process. A zero in this field would mean that the reply reminder process is disabled for the present invention. Field 54 the date to start the reply reminder process. In this record, the start date is May 1, 2003. Field 55 contains the time to begin the process on the designated date. In this record, the start time is 9 o'clock am. Field 56 indicates the time interval between reply reminders that are sent to the message recipient. In this record, the time interval is 4 hours. This interval can vary with respect to hour and minute designations. Field 57 is the sender notification field. In this example, the field has a zero designation. The sender would not receiver notices of reply reminders messages sent to the message recipient. A "1" in this field would enable the sender to receive notices of reply reminder messages sent to the recipient.

FIG. 4 is illustrates the primary components of the system of the present invention. As shown, the system of the present invention has a reply reminder creation component 58 and a reply reminder implementation component 59. In a preferred embodiment, the reply reminder creation component 58 would operate from the sender side prior to transmission of the electronic message and the reply reminder implementation component 59 would operate from the message recipient side after receipt of the message. Ideally, each user would have a package containing both the creation and implementation components of the present invention. The appropriate component would be activated as needed to perform the desired task.

Figure 5:
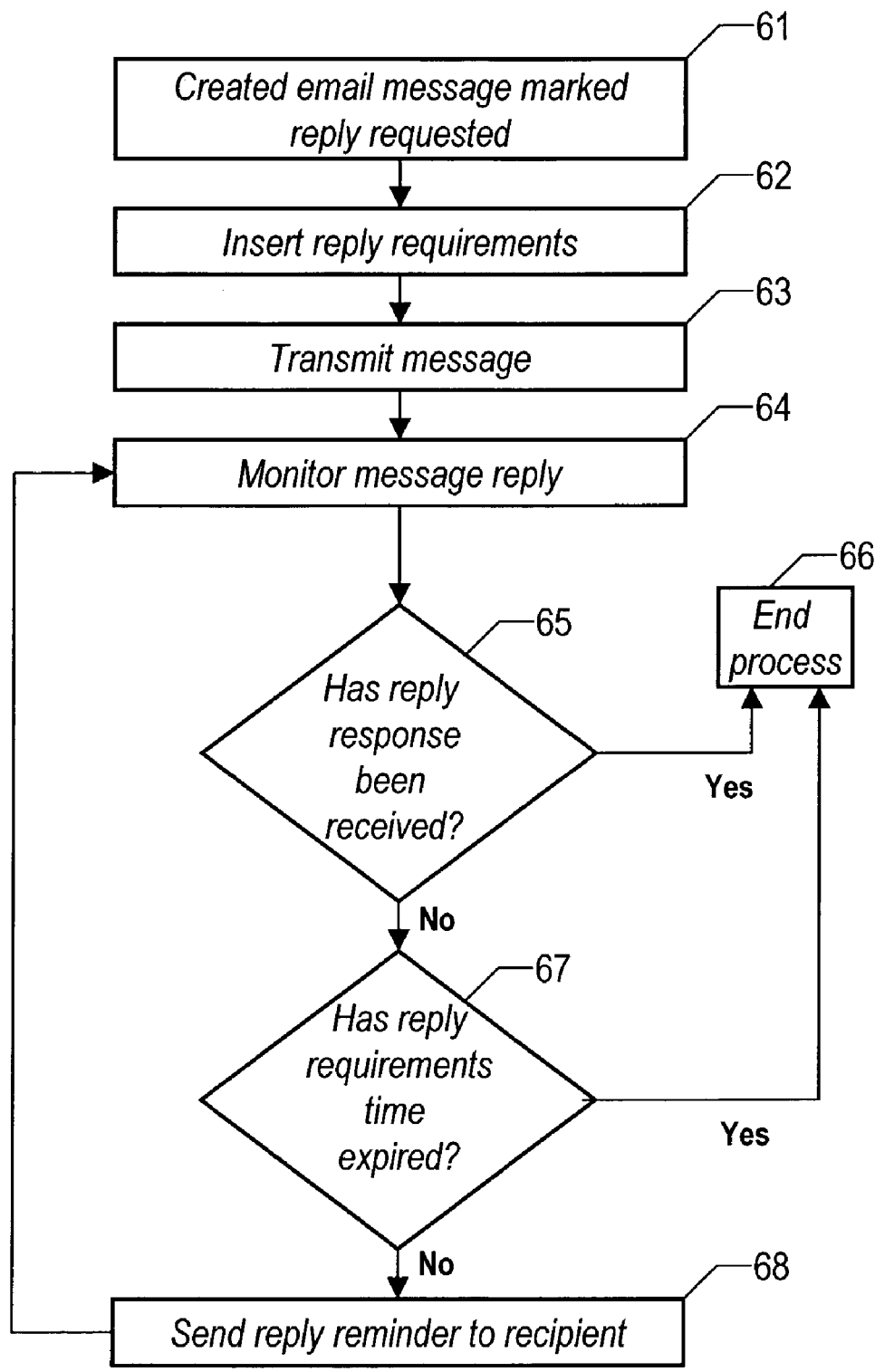
FIG. 5 is a flow diagram of the general method of the present invention.

FIG. 5 is an illustration of the general method of the present invention. In step 61, the sender marks a created message in which the sender desires a reply message from the message recipient. The reply reminder process could prompt this marking step automatically or this marking step could be initiated by an action of the user. The sender could activate the marking step by selecting the reply reminder icon 40 from the message screen. As mentioned, the other approach could involve a prompt from the process to which the sender could respond. If the sender desires a reply, the sender would supply the reply requirement parameters. These parameters could be inserted into a created record that is attached to the message. The method proceeds to step 62, where the reply parameters supplied by the sender are incorporated into a record 55. In this step, the method of the present invention will retrieve reply requirements established and supplied by the sender. These requirements are stored in designated locations in the created record 55 for use during the reply reminder process. At this point, the created message is transmitted to the recipient in step 63. As with other aspects of this invention, the reply requirement parameter information in record 55 can also be sent to the recipient as an addendum or attachment to the message. This addendum could be attached to the bottom of the message so that the recipient processes will detect that there are reply requirements for this message. After the transmission of the message, the sender can receive confirmation that the intended recipient did receive the massage. The acknowledgement could service to start the monitoring process, step 64, of the reply requirement parameters for that message. During the reply monitoring process, there will periodic checks to determine whether there has been a response to the transmitted electronic message. These response determinations will occur in step 65. The periodic status checks could be based on the user-incorporated parameters or the check period interval could be automatic and internal to the process. If during a status check, there has been a response to the message, the process will detect this response and the method will terminate in step 66. If during a status check, there is a determination that the recipient has not responded to the message, there is a determination of whether a time to respond requirement has expired in step 67. If this response time requirement has expired, the method will also terminate in step 66. If the time response time requirement has not expired, a reminder message will be initiated and sent to the recipient in step 68. If after transmission of multiple reminder messages to the recipient, there is no response, the periodic check in step 65 will terminate the process in step 66. If the sender desires, there can also be a record of the number of recipients that did not respond to the electronic message.

Figure 6:
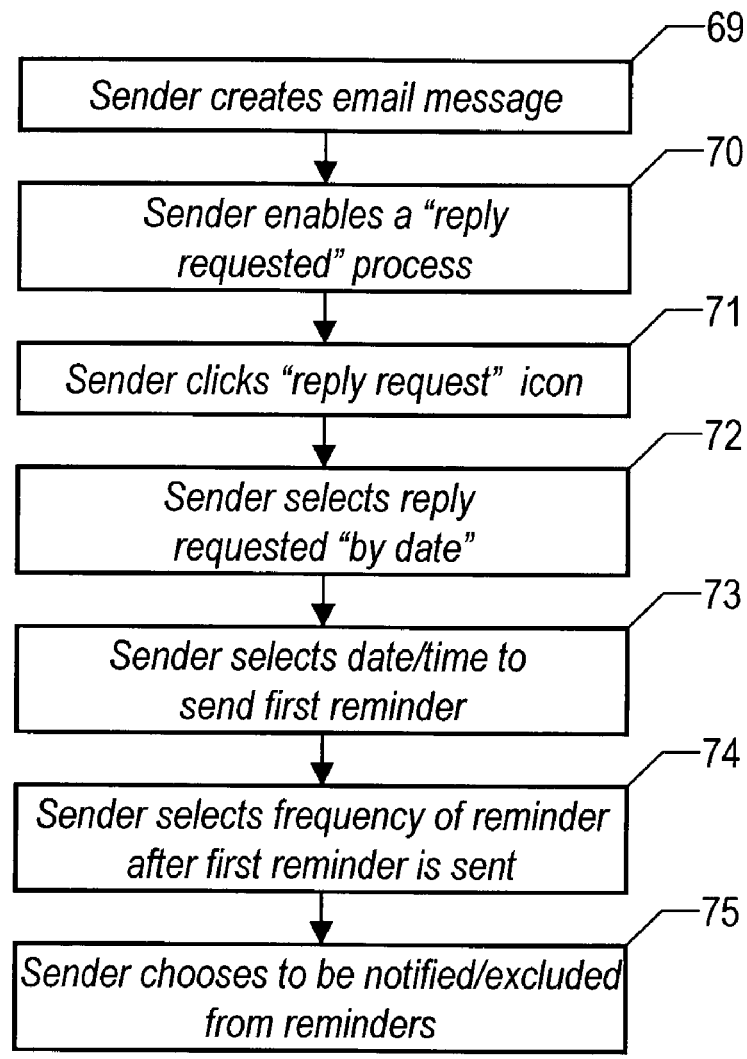
FIG. 6 is a flow diagram of the implementation of the method of the present invention from the sender of the electronic message.

The method of the present invention involves interaction with the sender of an electronic message as previously indicated in the reply reminder creation component 58. FIG. 6 illustrates the steps related to the sender activity during the implementation of the method of the invention. In step 69, the sender creates a message for electronic transmission using conventional message creation means. At the completion of the creation of the message and when a response is desired, the sender can enable a reply request process for this message in step 70 as described in FIGS. 3a, 3b and 3c. The designation of the message as one desiring a response can enable to sender to select or describe the parameters under which the sender wants a recipient to reply. In step 71 the sender clicks the reply reminder icon on the message screen. The sender then supplies the reply reminder parameters in step 72. These parameters can include date by which the sender desires a reply. This reply date can be sent to the recipient along with the message. At this point, the sender can select the date and time of the first reminder to be sent to the recipient to reply to the message in step 73, when the recipient has not replied to the message. The parameter selected in step 74 is the frequency of the reminder messages to be sent a recipient. The monitoring process will be performed in accordance with these parameters.

In step 75, the sender selects whether to be notified each time a reminder message is sent to a recipient. A sender may choose to be notified, at a predetermined reminder interval, that the response has not yet been received for a previously transmitted message. However, in the case where the recipients of a message is very large, the sender may wish for reminders to be sent to the recipients, but not copied to the sender. There can also be an embodiment of the present invention, such that the method of this invention can detect when remote messages have not been received and therefore there is not reply response. In addition, the present invention has the ability to distinguish between an automatic reply such as "out of the office" and a substantive response from the recipient.

Figure 7:
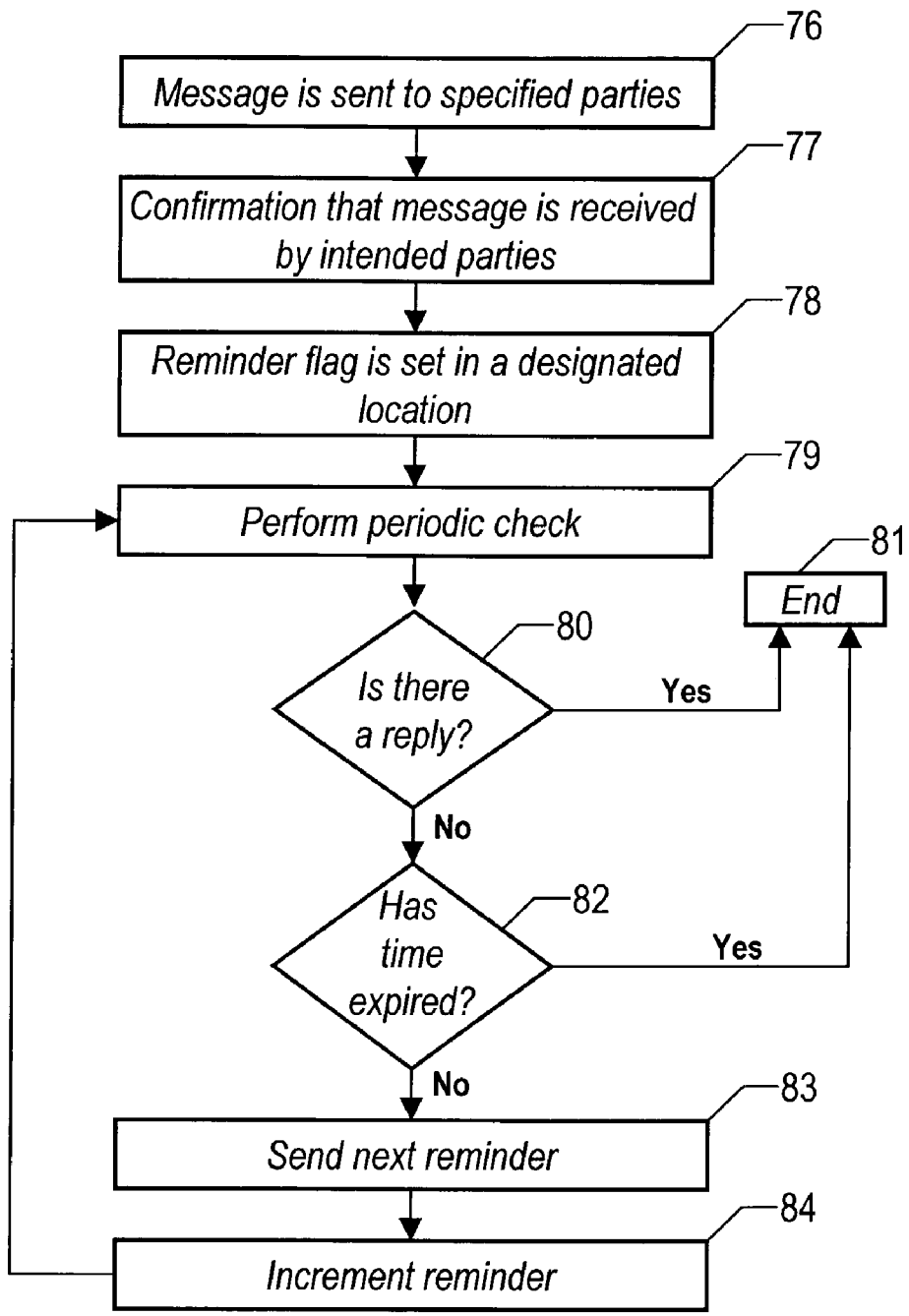
FIG. 7 is a detailed flow diagram of the implementation of the method of the present invention from the electronic message recipient side.

At the end of the process of FIG. 6, the process of the present invention is in a monitoring stage, component 59, waiting for a reply to the message from the message recipient. Referring to FIG. 7, in step 76, the message is sent to the recipient. The next step 77 is to confirm the receipt of the message by the intended parties. At this point, a reminder flag is set in the receiver's email database, step 78. This flag can also be set in the database of the sender. The specific implementation may vary, however, in the preferred implementation, a simple table entry or field would be added to the email database repository to hold reminder metadata. A scanning function would then, at specific intervals, parse the new field and take action on any reminders, which need to be issued either locally, or locally and to the remote message originator.

After the message has been sent and the reminder flag is set, there are periodic status checks to determine if there has been a response to the message 79. The determination of whether there has been a response occurs in step 80. It is possible and preferred that during this same time and prior to the reply due date specified by the sender, the recipient can generate a reply message. If there is a reply by a recipient, the process will terminate at box 81. If however, there is no reply and the first reminder date and time arrives, the method proceeds to step 82, where there is determination of whether there has been the expiration of a total reply time to respond to the message. In this case when the total reply time has expired, the process terminates in box 61. As previously mentioned, the sender can have an option to receive a record for each reminder where recipient did not respond to the message. If the total time to respond has not expired, the process moves to step 83 where the next reminder message is sent to the recipient. In order to keep track of the number of reminder messages sent to a particular recipient a counter can be used to count each reminder message transmission. This message transmission count occurs in step 84. As part of this counting process, the counter is initially set to zero. Each time a reminder message is sent, the counter is incremented by one. After the counter is incremented in step 84, the process returns to the period status check in step 79. In an alternate embodiment, the periodic check can occur at points when it is not time to send a reminder. In these cases, there is a determination of whether it is time to transmit a reminder message. If it is not time to transmit a reminder message, the process returns to the periodic status check in step 59.

If the message is sent to multiple recipients, the tracking process of the present invention can be implemented for each recipient. This process would continue until a reply is received, or the due date/time has expired at which point, the reminder bit would likely be unset. Additionally, the reminder message could optionally be modified based on nearness to due date/time, for example:

First reminder: "Please take the time to respond to this important note"

Last reminder: "This is your final reminder, if no response is received by close of business, escalation to your manager will occur". These are, of course, just sample messages that could be included in an implementation of the invention.

Referring to step 83 where there is an initiation of the process of sending a reminder message to the recipient, one implementation of step 83 is to execute a scan function to detect whether the reminder flag set for the current date/time on a specific message/note. A reminder message is issued to message recipient, or recipient and sender if the sender wishes to be reminded as well. The reminder message could be a standard message such as:

"A response is due for the following note: Note Name", or the sender could have the option of specifying the reminder at time of function activation, such as:

"This data is very important and I would appreciate a prompt reply".

Additionally, the reminder could take multiple forms at both the local and remote workstations including a new email message, a screen pop up, or other forms of electronic notification such as pager or cellular messages. Another implementation, possibly from the overdue user's end, would be a pop-up window reminding of the overdue response containing a "reply with history" message automatically filled out and addressed to the user, offering an immediate opportunity to respond. It should also be noted that a set of user controls could be implemented whereby the sender and/or receiver of a tagged note would have the ability to modify reminder behavior or to disable it altogether.

The electronic message reminder system of the present invention can be added to a legacy email application. This addition would likely entail adding a new email tag to mark a document for the tracking system. In addition, a new email database field(s) would likely be required to maintain the date/time index for each such tagged email, and a scanning function would be required to determine when a given note reminder should be activated. Multiple implementation possibilities exist, but in one embodiment, the marking function would be implemented using legacy methods such as those used to mark messages urgent, private, etcetera. The scanning function could be implemented using a tool such as the CRON utility in UNIX systems whereby at a given interval, the marked messages, or a state table representing the marked messages is checked and action taken based on current state data. Finally, disabling the reminder function would remove the mark and the state of a reply to that message would no longer be tracked.

All other legacy email functions remain in effect. This invention is an important addition to email functionality providing for a robust closed loop system where it is important to receive responses to specific email notes. It is important to note that while the present invention has been described in the context of a fully functioning data processing system, those skilled in the art will appreciate that the processes of the present invention are capable of being distributed in the form of instructions in a non-transitory computer readable storage medium and a variety of other forms, regardless of the particular type of medium used to carry out the distribution. Examples of non-transitory computer readable storage media include media such as EPROM, ROM, tape, paper, floppy disc, hard disk drive, RAM, and CD-ROMs.

We claim:

1. A method for notifying a recipient of an electronic message of message reply requirements, said method comprising:

in response to an activation of an email reply reminder process, a processor at a data processing system of a sender displaying a popup menu on a display of the data processing system;

said processor receiving reply information supplied to the popup menu by the sender in response to the popup menu, wherein the reply information is related to a reply by the recipient to the message, wherein the reply information supplied to the popup menu by the sender comprises a date and time of day to send a first reply reminder message to the recipient, a frequency consisting of a constant time interval between successive reply reminder messages sent to the recipient, and a notification indicator indicating whether or not to notify the sender of each time a reply reminder message of the successive reply reminder messages is sent to the recipient, and wherein the successive reply reminder messages consist of the first reply reminder message and a plurality of additional reply reminder messages;

said processor generating, from the supplied reply information, a data record comprising the date and time of day, the frequency, and the notification indicator;

said processor attaching the data record to the electronic message;

said processor transmitting the electronic message having the attached data record to the recipient;

said processor monitoring whether the sender has received a response, from the recipient, to the transmitted electronic message;

said processor ascertaining from said monitoring that the sender has not received said response to the electronic message from the recipient; and in response to said ascertaining, said processor sending the first reply reminder message to the recipient at the date and time of day.

2. The method of claim 1, wherein said transmitting the electronic message comprises transmitting a selected date and time to respond along with the electronic message having the attached data record and wherein said method further comprises:

said processor determining from said monitoring that the sender has not received said response to the electronic message from the recipient by the selected date and time to respond; and in response to said determining from said monitoring that a response to the electronic message has not been received by the sender from the recipient by the selected date and time to respond, said processor terminating said monitoring.

3. The method of claim 1, wherein the method further comprises:

after said sending the first reply reminder message to the recipient, said processor periodically sending the additional reply reminder messages to the recipient at the frequency until said monitoring determines that the sender has received said response to the electronic message from the recipient.

4. The method of claim 3, wherein the method further comprises:

after each reply reminder message of the successive reply reminder messages has been sent to the recipient, said processor computing a count of a total number of said successive reply reminder messages that have been sent to the recipient.

5. The method of claim 3, wherein the notification indicator indicates that the sender is to be notified each time a reply reminder message of the successive reply reminder messages is sent to the recipient, and wherein the method further comprises:

said processor notifying the sender each time a reply reminder message of the successive reply reminder messages is sent to the recipient.

6. The method of claim 1, wherein the reply information supplied to the popup menu by the sender further comprises a reply reminder process indicator indicating whether or not the email reply reminder process has been enabled.

7. The method of claim 6, wherein the reply information supplied to the popup menu by the sender consists of the reply reminder process indicator, the date and time of day, the frequency, and the notification indicator.

8. The method of claim 6, wherein the reply reminder process indicator supplied to the popup menu by the sender indicates that the email reply reminder process has been enabled, and wherein the data record further comprises the reply reminder process indicator which indicates that the email reply reminder process has been enabled.

9. The method of claim 8, wherein the data record consists of the reply reminder process indicator, the date and time of day, the frequency, and the notification indicator.

10. The method of claim 1, wherein the popup menu comprises icons enabling the sender to submit, cancel, or change the reply information supplied to the popup menu by the sender.

11. A computer program product, comprising a non-transitory computer readable storage medium having instructions stored therein, said instructions configured to be executed by a processor of a data processing system to implement a method for notifying a recipient of an electronic message of message reply requirements, said method comprising:

in response to an activation of an email reply reminder process, displaying a popup menu on a display of a data processing system;

receiving reply information supplied to the popup menu by the sender in response to the popup menu, wherein the reply information is related to a reply by the recipient to the message, wherein the reply information supplied to the popup menu by the sender comprises a date and time of day to send a first reply reminder message to the recipient, a frequency consisting of a constant time interval between successive reply reminder messages sent to the recipient, and a notification indicator indicating whether or not to notify the sender each time a reply reminder message of the successive reply reminder messages is sent to the recipient, and wherein the successive reply reminder messages consist of the first reply reminder message and a plurality of additional reply reminder messages;

generating, from the supplied reply information, a data record comprising the date and time of day, the frequency, and the notification indicator;

attaching the data record to the electronic message;

transmitting the electronic message having the attached data record to the recipient;

monitoring whether the sender has received a response, from the recipient, to the transmitted electronic message;

ascertaining from said monitoring that the sender has not received said response to the electronic message from the recipient; and in response to said ascertaining, sending the first reply reminder message to the recipient at the date and time of day.

12. The computer program product of claim 11, wherein said transmitting the electronic message comprises transmitting a selected date and time to respond along with the electronic message having the attached data record, and wherein said method further comprises:

determining from said monitoring that the sender has not received said response to the electronic message from the recipient by the selected date and time to respond; and in response to said determining from said monitoring that a response to the electronic message has not been received by the sender from the recipient by the selected date and time to respond, terminating said monitoring.

13. The computer program product of claim 12, wherein the method further comprises:

after said sending the first reply reminder message to the recipient, said processor periodically sending the additional reply reminder messages to the recipient at the frequency until said monitoring determines that the sender has received said response to the electronic message from the recipient.

14. The computer program product of claim 13, wherein the method further comprises:

after each reply reminder message of the successive reply reminder messages has been sent to the recipient, said processor computing a count of a total number of said successive reply reminder messages that have been sent to the recipient.

15. The computer program product of claim 13, wherein the notification indicator indicates that the sender is to be notified each time a reply reminder message of the successive reply reminder messages is sent to the recipient, and wherein the method further comprises:

said processor notifying the sender each time a reply reminder message of the successive reply reminder messages is sent to the recipient.

16. The computer program product of claim 11, wherein the reply information supplied to the popup menu by the sender further comprises a reply reminder process indicator indicating whether or not the email reply reminder process has been enabled.

17. The computer program product of claim 16, wherein the reply information supplied to the popup menu by the sender consists of the reply reminder process indicator, the date and time of day, the frequency, and the notification indicator.

18. The computer program product of claim 16, wherein the reply reminder process indicator supplied to the popup menu by the sender indicates that the email reply reminder process has been enabled, and wherein the data record further comprises the reply reminder process indicator which indicates that the email reply reminder process has been enabled.

19. The computer program product of claim 18, wherein the data record consists of the reply reminder process indicator, the date and time of day, the frequency, and the notification indicator.

20. The computer program product of claim 11, wherein the popup menu comprises icons enabling the sender to submit, cancel, or change the reply information supplied to the popup menu by the sender.

21. A data processing system comprising a processor and a computer readable memory unit coupled to the processor, said memory unit containing instructions configured to be executed by the processor to implement a method for notifying a recipient of an electronic message of message reply requirements, said method comprising:

in response to an activation of an email reply reminder process, displaying a popup menu on a display of a data processing system;

receiving reply information supplied to the popup menu by the sender in response to the popup menu, wherein the reply information is related to a reply by the recipient to the message, wherein the reply information supplied to the popup menu by the sender comprises a date and time of day to send a first reply reminder message to the recipient, a frequency consisting of a constant time interval between successive reply reminder messages sent to the recipient, and a notification indicator indicating whether or not to notify the sender each time a reply reminder message of the successive reply reminder messages is sent to the recipient, and wherein the successive reply reminder messages consist of the first reply reminder message and a plurality of additional reply reminder messages;

generating, from the supplied reply information, a data record comprising the date and time of day, the frequency, and the notification indicator;

attaching the data record to the electronic message;

transmitting the electronic message having the attached data record to the recipient;

monitoring whether the sender has received a response, from the recipient, to the transmitted electronic message;

ascertaining from said monitoring that the sender has not received said response to the electronic message from the recipient; and in response to said ascertaining, sending the first reply reminder message to the recipient at the date and time of day.

22. The system of claim 21, wherein said transmitting the electronic message comprises transmitting a selected date and time to respond along with the electronic message having the attached data record, and wherein said method further comprises:

determining from said monitoring that the sender has not received said response to the electronic message from the recipient by the selected date and time to respond; and in response to said determining from said monitoring that a response to the electronic message has not been received by the sender from the recipient by the selected date and time to respond, terminating said monitoring.

23. The system of claim 22, wherein the method further comprises:

after said sending the first reply reminder message to the recipient, said processor periodically sending the additional reply reminder messages to the recipient at the frequency until said monitoring determines that the sender has received said response to the electronic message from the recipient.

24. The system of claim 23, wherein the method further comprises:

after each reply reminder message of the successive reply reminder messages has been sent to the recipient, said processor computing a count of a total number of said successive reply reminder messages that have been sent to the recipient.

25. The system of claim 23, wherein the notification indicator indicates that the sender is to be notified each time a reply reminder message of the successive reply reminder messages is sent to the recipient, and wherein the method further comprises:

said processor notifying the sender each time a reply reminder message of the successive reply reminder messages is sent to the recipient.

26. The system of claim 21, wherein the reply information supplied to the popup menu by the sender further comprises a reply reminder process indicator indicating whether or not the email reply reminder process has been enabled.

27. The system of claim 26, wherein the reply information supplied to the popup menu by the sender consists of the reply reminder process indicator, the date and time of day, the frequency, and the notification indicator.

28. The system of claim 26, wherein the reply reminder process indicator supplied to the popup menu by the sender indicates that the email reply reminder process has been enabled, and wherein the data record further comprises the reply reminder process indicator which indicates that the email reply reminder process has been enabled.

29. The system of claim 28, wherein the data record consists of the reply reminder process indicator, the date and time of day, the frequency, and the notification indicator.

30. The system of claim 21, wherein the popup menu comprises icons enabling the sender to submit, cancel, or change the reply information supplied to the popup menu by the sender.

* * * * *